(12) United States Patent
Kako et al.

(10) Patent No.: US 6,427,771 B1
(45) Date of Patent: Aug. 6, 2002

(54) VEHICLE AIR CONDITIONER AND MANUFACTURING METHOD THEREOF

(75) Inventors: Hideaki Kako, Kariya; Shuji Kurita, Toyoake, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/431,800

(22) Filed: Nov. 1, 1999

(30) Foreign Application Priority Data

Nov. 11, 1998 (JP) .......................................... 10-320961
Mar. 11, 1999 (JP) .......................................... 11-065344

(51) Int. Cl.7 ................................................ B60H 1/00
(52) U.S. Cl. ...................... 165/204; 454/121; 454/160; 165/42
(58) Field of Search .............................. 165/41, 42, 43, 165/201, 202, 203, 204; 454/159, 160, 121

(56) References Cited

U.S. PATENT DOCUMENTS

| | | | |
|---|---|---|---|
| 4,523,633 A | 6/1985 | Furukawa | 165/41 X |
| 4,834,170 A | * 5/1989 | Sakurada et al. | 165/43 |
| 5,755,107 A | 5/1998 | Shirota et al. | 165/42 X |

FOREIGN PATENT DOCUMENTS

| | | | |
|---|---|---|---|
| EP | 0756955 A2 | 2/1997 | |
| GB | 2 300 043 A | 10/1996 | |
| JP | 57-209415 | * 12/1982 | ................ 165/42 |
| JP | A-9-188123 | 7/1997 | |
| WO | WO 98/34805 A1 | 8/1998 | |

OTHER PUBLICATIONS

Abstracts for JP 11208245 (Published Aug. 3, 1999).

* cited by examiner

*Primary Examiner*—Ljiljana Ciric
(74) *Attorney, Agent, or Firm*—Harness, Dickey & Pierce, PLC (57) ABSTRACT

A vehicle air conditioner has a blower unit and an air conditioning unit having a case and a heater core disposed in a substantially horizontal direction in the case. The case has a foot opening at an upper side of the heater core. A foot passage and a foot duct are disposed at a vehicle front side of the case to extend downwardly from an upper portion of the case to a bottom portion of the case. The foot duct has foot outlets at a lower portion thereof. In a foot mode in which the foot opening is opened, air flowing at an upper side of the heater core flows into the foot passage through the foot opening, flows through the foot duct, and is directly blown toward a foot portion of a passenger in a passenger compartment through the foot outlets. As a result, heating feeling is improved, and a size of the air conditioner in a vehicle width direction is reduced.

18 Claims, 5 Drawing Sheets

VEHICLE AIR CONDITIONER AND MANUFACTURING METHOD THEREOF

CROSS REFERENCE TO RELATED APPLICATIONS

This application relates to and claims priority from Japanese Patent Application Nos. 10-320961 filed on Nov. 11, 1998 and 11-65344 filed on Mar. 11, 1999, the contents of which are hereby incorporated by reference.

BACKGROUND OF THE INVENTION

1. Field of the Invention

The present invention relates generally to a vehicle air conditioner, and particularly to an air conditioning unit of the vehicle air conditioner, in which a heat exchanger is disposed in a substantially horizontal direction, and air blown by a blower flows through the heat exchanger in a substantially vertical direction.

2. Related Art

U.S. Pat. No. 5,755,107 discloses a vehicle air conditioner having an air conditioning unit disposed in a passenger compartment of the vehicle. In the air conditioning unit, a cooling heat exchanger (evaporator) is disposed in a substantially horizontal direction, and a heating heat exchanger (heater core) is also disposed in a substantially horizontal direction at an upper side of the cooling heat exchanger. A blower is disposed on a side of the air conditioning unit in a vehicle width direction. As a result, a size of the air conditioning unit is reduced.

In the air conditioning unit, air blown by the blower flows into a space below the cooling heat exchanger in the substantially horizontal direction (i.e., vehicle width direction). Then, air changes a flow direction in the space, and flows upwardly through the cooling heat exchanger and the heating heat exchanger. After a temperature of air is adjusted to a predetermined value by the cooling and heating heat exchangers, air is blown into the passenger compartment.

In the air conditioner, an air duct does not need to be disposed on a front or rear side of the air conditioning unit, thereby reducing a size of the air conditioning unit in a vehicle front-rear direction. Further, since both the cooling and heating heat exchangers are disposed respectively in the substantially horizontal direction, a size of the air conditioning unit in a vehicle up-down direction is also reduced.

However, in the above-mentioned air conditioning unit, foot ducts through which air is blown toward foot portions of passengers in the passenger compartment are disposed on both right and left side surfaces of a case of the air conditioning unit so that air is blown toward the foot portions of both a driver and a front passenger. Therefore, a size of the air conditioning unit is increased by a size of the right and left foot ducts in the vehicle width direction. As a result, a space for accommodating the foot portions of the driver and the front passenger (hereinafter referred to as foot accommodating space) in the passenger compartment is reduced by the foot ducts. Especially in the foot accommodating space of the driver, it becomes difficult to secure both a space for accommodating operation pedals such as an accelerator pedal and a brake pedal and a space for accommodating the air conditioning unit.

JP-A-9-188123 also discloses a vehicle air conditioner having an air conditioning unit in which a heat exchanger is disposed in a substantially horizontal direction. However, since a blower unit is disposed on a vehicle front side of a case of the air conditioning unit, a size of the air conditioner in a vehicle front-rear direction is increased. As a result, it becomes difficult to mount the air conditioner on an instrumental panel in a passenger compartment.

Further, in the air conditioner, a foot opening is disposed at a vehicle rear portion of the case, and air is blown toward a foot portion of a passenger through the foot opening in a foot mode. Generally, warm air needs to be blown especially to a portion from an ankle to a toe of the foot portion of the passenger to improve heating feeling. However, the foot opening is disposed at the vehicle rear portion of the case and is far away from the toe of the passenger. Therefore, it is difficult to blow warm air directly to the toe of the passenger, or an additional long foot duct extending from the foot opening to the toe of the passenger is required.

Further, in both U.S. Pat. No. 5,755,107 and JP-A-9-188123, a separation point where air from the foot opening is blown separately to vehicle right and left sides is disposed at a downstream air side of the heating heat exchanger to be adjacent to the heating heat exchanger. Generally, a temperature of air flowing at an immediately downstream air side of the heating heat exchanger is uniform. Therefore, air having an uniform temperature is blown separately to the vehicle right and left sides toward the foot portions of the driver and the front passenger. As a result, a temperature of air blown toward the foot portion of the driver may differ largely from a temperature of air blown toward the foot portion of the front passenger, thereby worsening heating feeling.

SUMMARY OF THE INVENTION

In view of the foregoing problems, it is an object of the present invention to improve mountability to a vehicle and heating feeling of a vehicle air conditioner in which a cooling :heat exchanger and a heating heat exchanger are disposed respectively in a substantially horizontal direction, and blown air flows through the heat exchangers in a substantially vertical direction.

According to the present invention, an air conditioner for a vehicle having a passenger compartment has a case, a cooling heat exchanger, a heating heat exchanger, a temperature adjusting member, an air mode switching door and a foot duct. The case forms an air passage through which air flows, and has a face opening, a defroster opening and a foot opening through which air is blown into the passenger compartment. The cooling heat exchanger is disposed in a substantially horizontal direction in the case for cooling air. The heating heat exchanger is disposed in a substantially horizontal direction in the case at an upper side of the cooling heat exchanger and at a lower side of the face, defroster and foot openings for heating air. The temperature adjusting member adjusts a temperature of air blown into the passenger compartment by adjusting an amount of the air heated by the heating heat exchanger. The air mode switching door opens and closes the face, defroster and foot openings. The foot duct is disposed at a vehicle front side of the case to communicate with the foot opening and extends downwardly from an upper portion of the case to a bottom portion of the case. Further, the foot duct has a foot outlet through which air is blown toward a foot portion of a passenger seated on a front seat in the passenger compartment at a lower portion thereof. Air flowing at an upper side of the heating heat exchanger in the case is introduced into the foot duct through the foot opening in a foot mode in which the foot opening is opened by the air mode switching door.

Since the foot duct is disposed at the vehicle front side of the case, a size of the air conditioner in the vehicle width direction is not increased by the foot duct. Therefore, a foot accommodating space of a driver and a front passenger in the passenger compartment is restricted from being reduced by the air conditioner. Thus, the air conditioner is mounted on the vehicle efficiently. Further, since the foot outlet is disposed at the lower portion of the foot duct, air is directly blown toward a toe of the passenger disposed below the instrumental panel at a vehicle front side. As a result, heating feeling is improved without providing an additional long foot duct extending from a vehicle rear portion of the case to a vehicle front portion of the case.

Preferably, the case is disposed at a substantially center of an instrumental panel in the passenger compartment in a vehicle width direction, and a blower unit for blowing air toward the case is disposed at a front passenger's side to be shifted from the case in the vehicle width direction. As a result, a size of the air conditioner in a vehicle front-rear direction is reduced, and the air conditioner is more efficiently mounted on the vehicle.

More preferably, the foot outlet has first and second foot outlet portions respectively disposed in right and left side walls of the foot duct facing each other in the vehicle width direction. Warm air from the foot opening flows through the foot duct, and then is separated to vehicle right and left sides through the first and second foot outlet portions. Therefore, the warm air is well mixed before being separated to the vehicle right and left sides. As a result, a difference between a temperature of air blown toward the driver and a temperature of air blown toward the front passenger is reduced, thereby further improving heating-feeling.

BRIEF DESCRIPTION OF THE DRAWINGS

This and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention are described hereinafter with reference to the accompanying drawings.

First Embodiment

Figure 1:
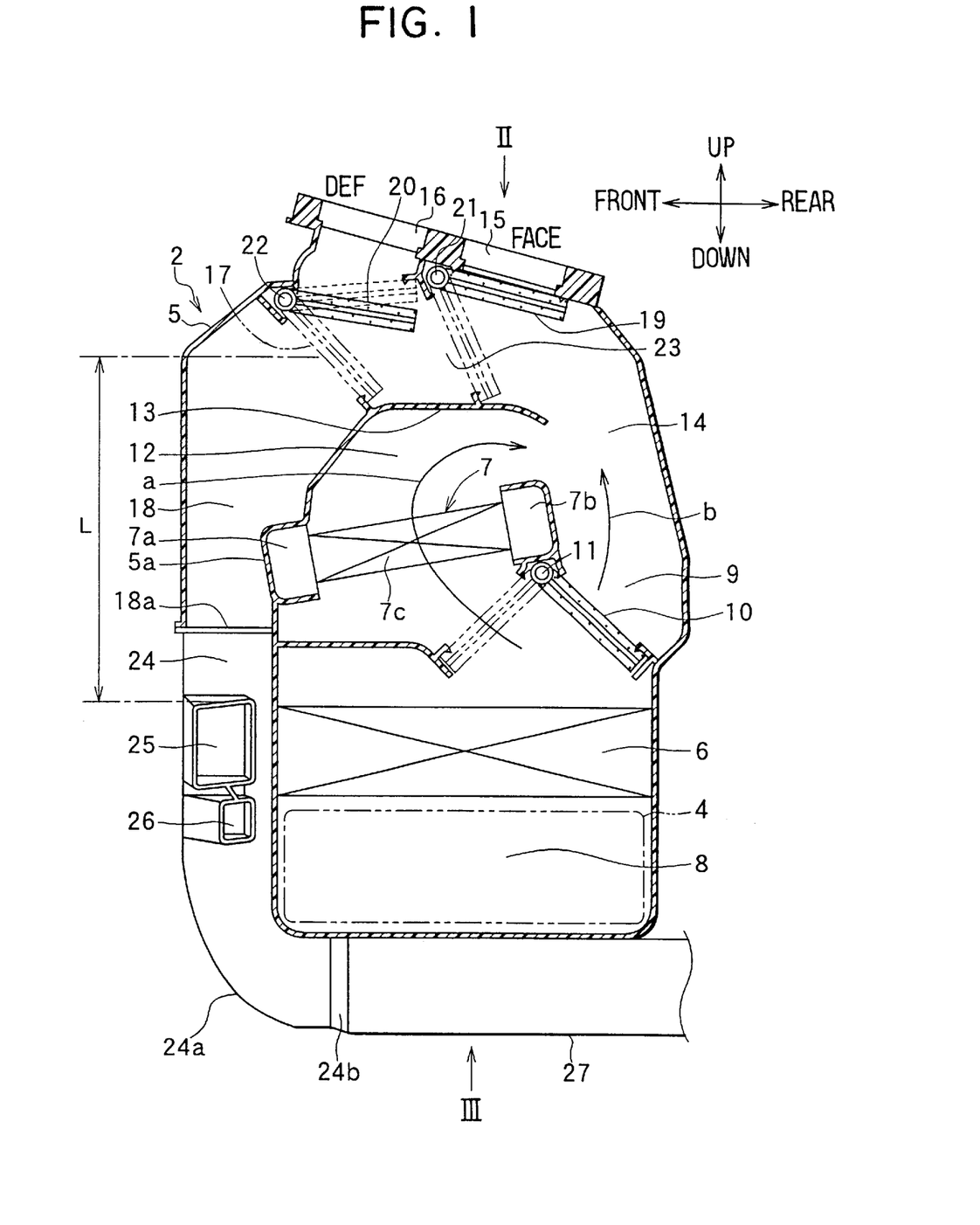
FIG. 1 is a schematic sectional view showing an air conditioning unit of a vehicle air conditioner according to a first preferred embodiment of the present invention.
Figure 2:
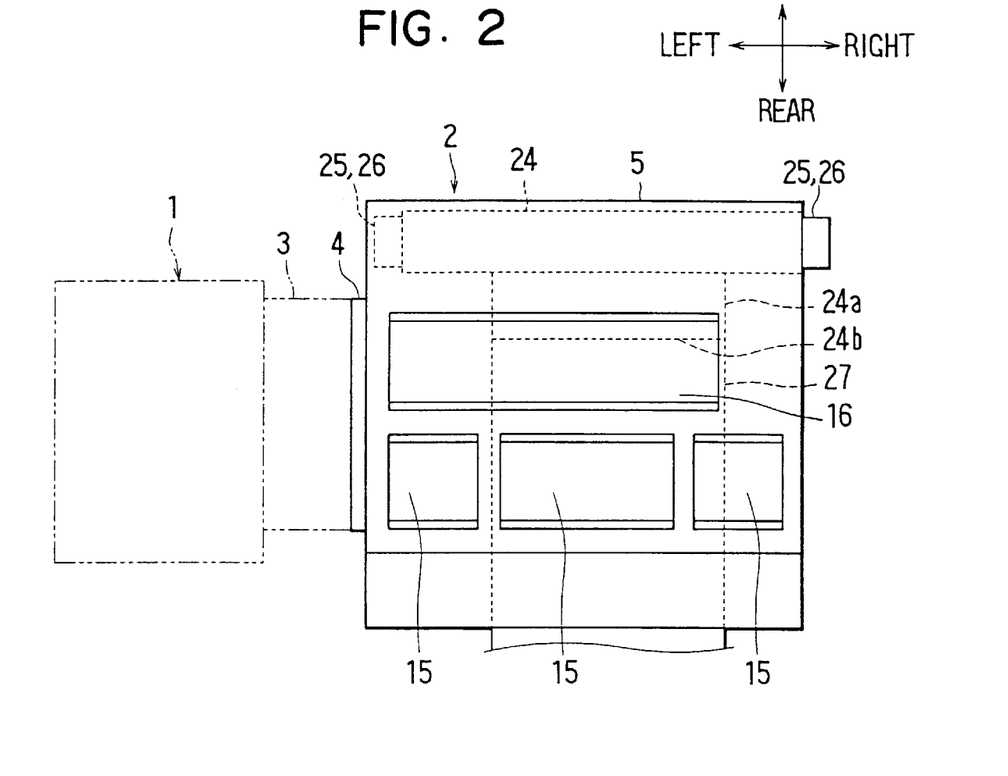
FIG. 2 is a top plan view taken from arrow II in FIG. 1.

A first preferred embodiment of the present invention will be described with reference to FIGS. 1–4. In the first embodiment, a vehicle air conditioner-is installed in a vehicle with a right-hand steering wheel to correspond to arrangement directions indicated by up-down, front-rear and right-left arrows in FIGS. 1 and 2. As shown in FIG. 2, the air conditioner has a blower unit 1 and an air conditioning unit 2, and is disposed adjacently to an instrumental panel at a front side of a passenger compartment of the vehicle. The air conditioning unit 2 is disposed at a substantially center of the instrumental panel in a vehicle width direction (i.e., vehicle right-left direction). The blower unit 1 is disposed in the passenger compartment at a front passenger's side to be shifted from the air conditioning unit 2 in the vehicle width direction. In the first embodiment, the blower unit 1 is disposed on a vehicle left side of the air conditioning unit 2 as shown in FIG. 2.

The blower unit 1 includes a well-known blower (not shown) and a well-known inside/outside air switching box (not shown). The inside/outside air switching box is disposed at an upper side of the blower for switchably introducing inside and outside air. The blower has a centrifugal fan for blowing air introduced into the inside/outside air switching box into an air inlet 4 of the air conditioning unit 2 through a connection duct 3.

The air conditioning unit 2 has a resin case 5 formed by joining plural case portions by fasteners such as screws or clips. The air inlet 4 is disposed at a lower end portion of a side surface of the case 5 at a front passenger side in the vehicle width direction. In the air conditioning unit 2, both an evaporator 6 (cooling heat exchanger) of a refrigerant cycle and a heater core 7 (heating heat exchanger) are disposed respectively in a substantially horizontal direction. As shown in FIG. 1, an air passage 8 is formed below the evaporator 6 in the case 5. Air blown by the blower unit 1 flows through the connection duct 3 and is introduced into the air passage 8 through the air inlet 4. In the air passage 8, air flows in a substantially horizontal direction from a vehicle left side to a vehicle right side, and then flows upwardly through a core portion (not shown) of the evaporator 6.

The evaporator 6 is formed into a thin rectangular parallelepiped, and has the core portion made of plural flat tubes (not shown) and corrugated fins (not shown) disposed between adjacent tubes and bonded thereto. When air upwardly passes through openings formed between the tubes and the fins of the core portion, refrigerant flowing through the tubes absorbs heat from air so that air is cooled.

The heater core 7 is also formed into a thin rectangular parallelepiped, and heats air using hot water (engine cooling water) from an engine of the vehicle. The heater core 7 is an one-way flow type and has an inlet tank 7a, an outlet tank 7b and a core portion 7c disposed between the inlet tank 7a and the outlet tank 7b. The core portion 7c is made of plural flat tubes (not shown) through which hot water flows and plural corrugated fins (not shown) disposed between adjacent tubes and bonded thereto. Hot water flows in one direction from the inlet tank 7a to the outlet tank 7b through the tubes.

As shown in FIG. 1, the heater core 7 is disposed at an upper side of the evaporator 6 in the case 5 to be slightly inclined so that the outlet tank 7b is disposed higher than the inlet tank 7a. Air from the evaporator 6 is heated by the heater core 7 and is discharged upwardly. The heater core 7 is disposed at a substantially center of the case 5 in the vehicle front-rear direction. Further, a bypass passage 9 through which air flows to bypass the heater core 7 is formed in the case 5 at a vehicle rear side of the heater core 7.

An air mixing door 10 is rotatably held by a rotation shaft 11 in the case 5 between the evaporator 6 and the heater core 7. The air mixing door 10 adjusts a ratio of an amount of air (warm air) flowing through the heater core 7 and an amount of air (cool air) flowing through the bypass passage 9 to control a temperature of air blown into the passenger compartment. That is, in the first embodiment, the temperature of air blown into the passenger compartment is adjusted by the air mixing door 10. Further, as shown in FIG. 1, a warm air passage 12 through which warm air "a" discharged from the heater core 7 flows is formed by a wall portion 13 of the case 5 at an upper side of the heater core 7. The warm air "a" from the warm air passage 12 and cool air "b" from the bypass passage 9 is mixed in an air mixing passage 14 so that mixed air has a predetermined temperature.

As shown in FIG. 1, a face opening 15 is formed in a vehicle rear portion of an upper surface of the case 5. The face opening 15 communicates with a face outlet (not shown) through which air is blown toward a head portion of the passenger. A defroster opening 16 is formed in the upper surface of the case 5 at a vehicle front side of the face opening 15. The defroster opening 16 communicates with a defroster outlet (not shown) through which air is blown toward a inner surface of a windshield of the vehicle. Further, a foot opening 17 is formed immediately below the defroster opening 16 in the case 5. Air is introduced into a foot passage 18 through the foot opening 17. The foot passage 18 is formed to extend forwardly from a point immediately below the defroster opening 16 by a small distance and then extend downwardly. The case 5 has a wall portion 5a disposed at a vehicle front side of the heater core 7. The foot passage 18 extends downwardly along the wall portion 5a from an upper portion of the case 5 at a front portion of the case 5. In the first embodiment, the heater core 7 is disposed between the foot passage 18 and the bypass passage 9 in the vehicle front-rear direction.

Still referring to FIG. 1, first and second air outlet mode switching doors 19, 20 are disposed immediately below the face and defroster openings 15, 16 in the case 5 and rotatably held by rotation shafts 21, 22, respectively. The first air mode switching door 19 opens and closes the face opening 15 and a communication opening 23 through which the air mixing passage 14 communicates with at least one of the defroster opening 16 and the foot opening 17. The second air mode switching door 20 opens and closes the defroster opening 16 and the foot opening 17.

The rotation shafts 21, 22 of the first and second air mode switching doors 19, 20 are connected to an air mode operation system through a common linkage (not shown) so that the doors 19, 20 are opened and closed by the air mode operation system. The rotation shaft 11 of the air mixing door 10 is also connected to an air temperature adjusting system through the linkage so that an opening degree of the air mixing door 10 is adjusted by the air temperature adjusting system. The air mode operation system and the air temperature adjusting system may be operated automatically using a servomotor or manually by a passenger.

As shown in FIG. 1, the foot passage 18 terminates at a substantially center of the case 5 in the vehicle up-down direction, that is, at a point slightly lower than the vehicle front end of the heater core 7, and has an open end 18a there. The open end 18a is connected to an upper end of a foot duct 24 by fasteners such as screws or clips, or by elastic engagement. The foot duct 24 is formed separately from the case 5 using resin, and is disposed at a lower side of the foot passage 18 in the vehicle up-down direction to communicate with the foot passage 18. The foot duct 24 has first and second foot outlets 25, 26 through which air is blown toward foot portions of passengers seated on front seats, that is, a driver and a front passenger. As shown in FIG. 2, the first and second foot outlets 25, 26 are formed in both right and left side walls of the foot duct 24 so that air is blown toward the foot portions of the driver and the front passenger.

As shown in FIG. 1, in the first embodiment, the first foot outlet 25 has a larger area than the second foot outlet 26, and is disposed at an upper side of the second foot outlet 26 in an up-down direction of the foot duct 24. Further, the second foot outlet 26 is inclined downwardly. As a result, warm air is blown uniformly toward the right foot and the left foot of the driver and the front passenger.

Further, as shown in FIG. 1, the foot duct 24 extends downwardly as low as a bottom portion of the case 5, and has a curved portion 24a to further extend along at a bottom surface of the case 5 toward a vehicle rear end. The foot duct 24 has an open end 24b disposed below the case 5 and opened toward the vehicle rear end. The open end 24b is connected to a rear seat foot duct 27 by fasteners such as screws or clips, or by elastic engagement. An upper surface of the rear seat foot duct 27 is attached to the bottom surface of the case 5 by fasteners such as screws or clips, or by elastic engagement. As a result, the open end 24b of the foot duct 24 is secured to the case 5 along with the rear seat foot duct 27.

Figure 3:
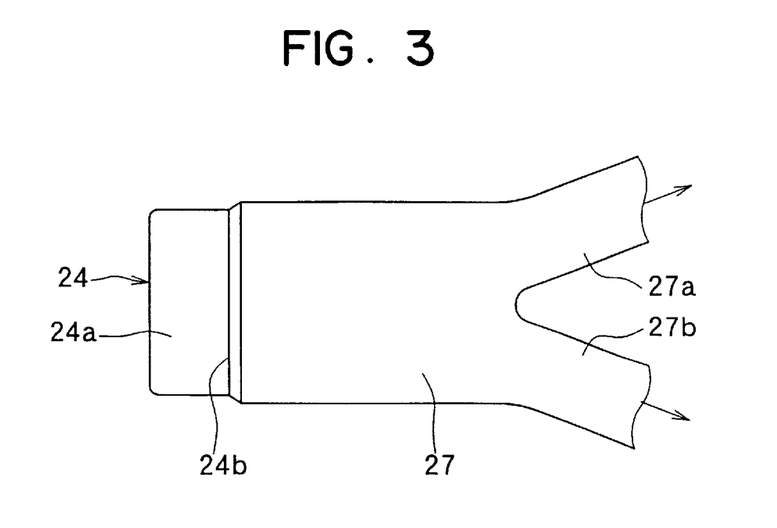
FIG. 3 is a bottom plan view taken from arrow III in FIG. 1.

The rear seat foot duct 27 is formed separately from the case 5 and the foot duct 24 using resin. As shown in FIG. 3, an end portion of the rear seat foot duct 27 is divided into two-duct portions 27a, 27b. The duct portions 27a, 27b extend to the vicinity of foot portions of passengers seated on rear seats in the passenger compartment so that warm air is blown toward the foot portions of the passengers seated on the rear seats. In FIG. 1, only the foot duct 24 and the rear seat foot duct 27 are shown by an external view, and the rest are shown by a sectional view.

Next, an operation of the air conditioner according to the first embodiment will be described. When an operation switch (not shown) of the air conditioner is turned on and the fan of the blower unit 1 is driven, inside/outside air sucked into the inside/outside air switching box flows through the connection duct 3 and is introduced into the air passage 8 from the air inlet 4. That is, air flows through the connection duct 3 in a substantially horizontal direction from the vehicle left side to the vehicle right side into the air passage 8. Next, air flows upwardly through the evaporator 6, and is dehumidified and cooled by refrigerant flowing through the tubes of the heater core of the evaporator 6. The cooled air from the evaporator 6 further flows upwardly, and is separately introduced into the heater core 7 and the bypass passage 9 according to the opening degree of the air mixing door 10. Air introduced into the heater core 7 is heated to become the warm air "a". The warm air "a" flows through the warm air passage 12 and is mixed with the cool air "b" from the bypass passage 9 in the air mixing passage 14 to have a predetermined temperature. The air having the predetermined temperature is blown into the passenger compartment through at least one of the face, defroster and foot openings 15–17 opened by the first and second air mode switching doors 19, 20. As a result, air in the passenger compartment is conditioned.

In a face mode, the first air mode switching door 19 is operated to a position shown by a two-dot chain line in FIG. 1 to fully close the communication opening 23 and fully open the face opening 15. As a result, air (cool air) is blown toward an upper body portion of the passenger in the passenger compartment through the face opening 15.

In a bi-level mode, the first air mode switching door 19 is operated to an intermediate position to open both the communication opening 23 and the face opening 15. At the same time, the second air mode switching door 20 is operated to a position shown by a dotted line in FIG. 1 to fully close the defroster opening 16 and fully open the foot opening 17. As a result, air is blown toward the upper body portion and the foot portion of the passenger in the passenger compartment through both the face and foot openings 15, 17.

In a foot mode, the first air mode switching door 19 is operated to a position shown by a solid line in FIG. 1 to fully open the communication opening 23 and fully close the face opening 15. At the same time, the second air mode switching door 20 is operated to a position shown by a solid line in FIG. 1 to open the defroster opening 16 by a small degree and open the foot opening 17 by a large degree. As a result, a small amount of air (warm air) is blown toward an inner surface of the windshield through the defroster opening 16, while a large amount of air (warm air) is blown toward the foot portion of the passenger through the foot opening 17.

According to the first embodiment, warm air from the foot opening 17 flows through the foot passage 18 and the foot duct 24, and is blown toward the foot portions of the driver and the front passenger through the foot outlets 25, 26. Since the foot passage 18 and the foot duct 24 extend downwardly at the vehicle front side of the case 5 from the upper portion of the case 5 to the bottom portion of the case 5, the foot outlets 25, 26 are disposed adjacently to the foot portions of the driver and the front passenger. Therefore, warm air in the foot duct 24 is blown directly to the foot portions of the driver and the front passenger from the foot outlets 25, 26. The portion from the ankle to the toe of the foot portion of the passenger is generally disposed in a vehicle front end portion of a space below the instrumental panel in the passenger compartment. According to the first embodiment, warm air from the foot outlets 25, 26 can be directly blown to the portion from the ankle to the toe of the passenger, thereby greatly improving heating feeling.

Further, as shown in FIG. 2, the foot duct 24 is disposed within a dimension of the case 5 in the vehicle width direction. Therefore, the foot accommodating space of the driver and the front passenger in the passenger compartment is restricted from being reduced by the foot duct 24.

Furthermore, in the first embodiment, the foot duct 24 and the case 5 are formed separately from each other. Therefore, the air conditioning unit 2 having the case 5 of a common specification can be used for various vehicle models, if each shape of the foot duct 24 and the foot outlets 25, 26 is modified according to characteristics of each vehicle model, such as a shape of the foot accommodating space in the passenger compartment. As a result, an appropriate air blowing condition from the foot outlets 25, 26 can be readily set for each vehicle model by modifying only the foot duct 24.

Further, according to the first embodiment, air from the air mixing passage 14 travels a relatively long distance through the foot passage 18 and the foot duct 24 and is separated to the vehicle right and left sides through the foot outlets 25, 26. Therefore, even if the warm air "a" and the cool air "b" is insufficiently mixed in the air mixing passage 14, the air from the air mixing passage 14 is sufficiently mixed to have a uniform temperature while flowing through the above-mentioned relatively long passage. As a result, a difference between a temperature of air blown toward the foot portion of the driver and a temperature of air blown toward the foot portion of the front passenger is reduced to a allowable level.

Figure 4:
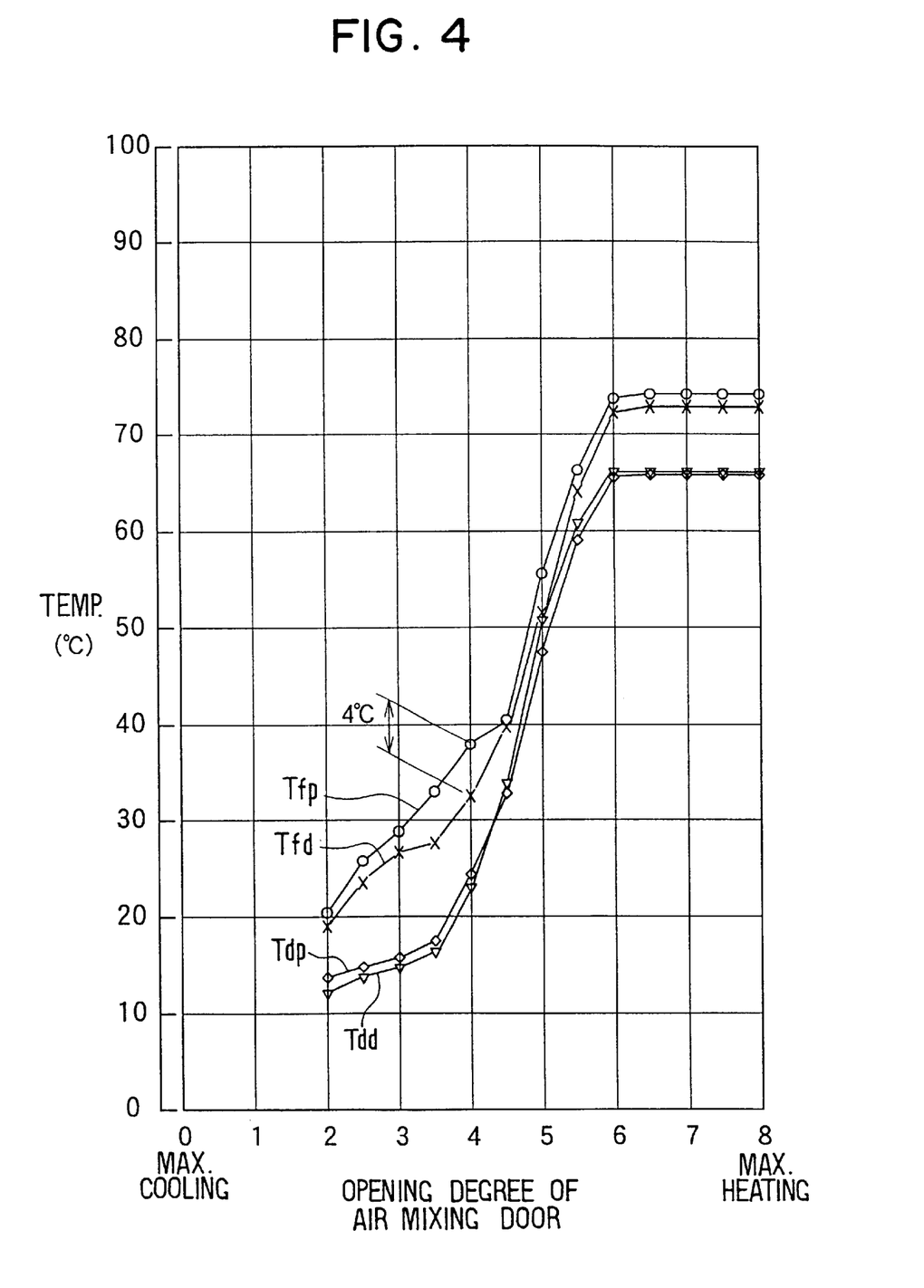
FIG. 4 is a graph showing a relationship between an opening degree of an air mixing door and a temperature (Tfp, Tfd, Tdp and Tdd) of air blown from a foot or defroster opening according to the first embodiment.

Next, a relationship between an opening degree of the air mixing door 10 and a temperature of air blown from the foot outlets 25, 26 and the defroster outlet to the driver and the front passenger in the foot mode was examined. The results are shown in FIG. 4. In FIG. 4, the opening degree of the air mixing door 10 is plotted on a horizontal axis, and a temperature of air is plotted on a vertical axis.

Tfp represents a temperature of air blown from the foot outlets 25, 26 to the front passenger, and Tfd represents a temperature of air blown from the foot outlets 25, 26 to the driver. Tdp represents a temperature of air blown from the defroster outlet at the front passenger side, and Tdd represents a temperature of air blown from the defroster outlet at the driver side. When the air mixing door 10 is operated to a position shown by a two-dot chain line in FIG. 1 to fully open the bypass passage 9 and introduce no air into the heater core 7, the opening degree of, the air mixing door 10 is 0. When the air mixing door 10 is operated to a position shown by a solid line in FIG. 1 to fully close the bypass passage 9 and introduce the whole air from the evaporator 6 into the heater core 7, the opening degree of the air mixing door 10 is 8.

As shown in FIG. 4, a difference between Tfp and Tfd is reduced to 4 degrees at its maximum. This reduction is achieved by separating warm air to the vehicle right and left sides through the foot outlets 25, 26 after warm air flows through a relatively long passage including the foot passage 18 and the foot duct 24. As a result, an air guiding unit or the like does not need to be provided to reduce the difference between Tfp and Tfd. In FIG. 4, a whole amount of air blown into the passenger compartment was 280 m$^3$/h, and a distance L between a center of the foot opening 17 and the foot outlet 25 in the vehicle up-down direction was 220 mm. According to study by the inventors, the distance L is preferably set to 150 mm or more to sufficiently reduce the difference between Tfp and Tfd.

In a foot/defroster mode, the second air mode switching door 20 is rotated clockwise by a predetermined degree from the position thereof in the foot mode so as to increase the opening degree of the defroster opening 16. In the foot/defroster mode, a ratio of an amount of warm air flowing through the defroster opening 16 and an amount of warm air flowing through the foot opening 17 is substantially 50/50%.

In a defroster mode, the second air mode switching door 20 is further rotated clockwise by a predetermined degree from the position thereof in the foot/defroster mode to a position shown by a two-dot chain line in FIG. 1. As a result, the door 20 fully opens the defroster opening 16 and fully closes the foot opening 17.

Second Embodiment

A second preferred embodiment of the present invention will be described with reference to FIGS. 5 and 6. In the second embodiment, components which are substantially the same as those in the first embodiment are assigned to the same reference numerals, and the explanation thereof is omitted.

Figure 5:
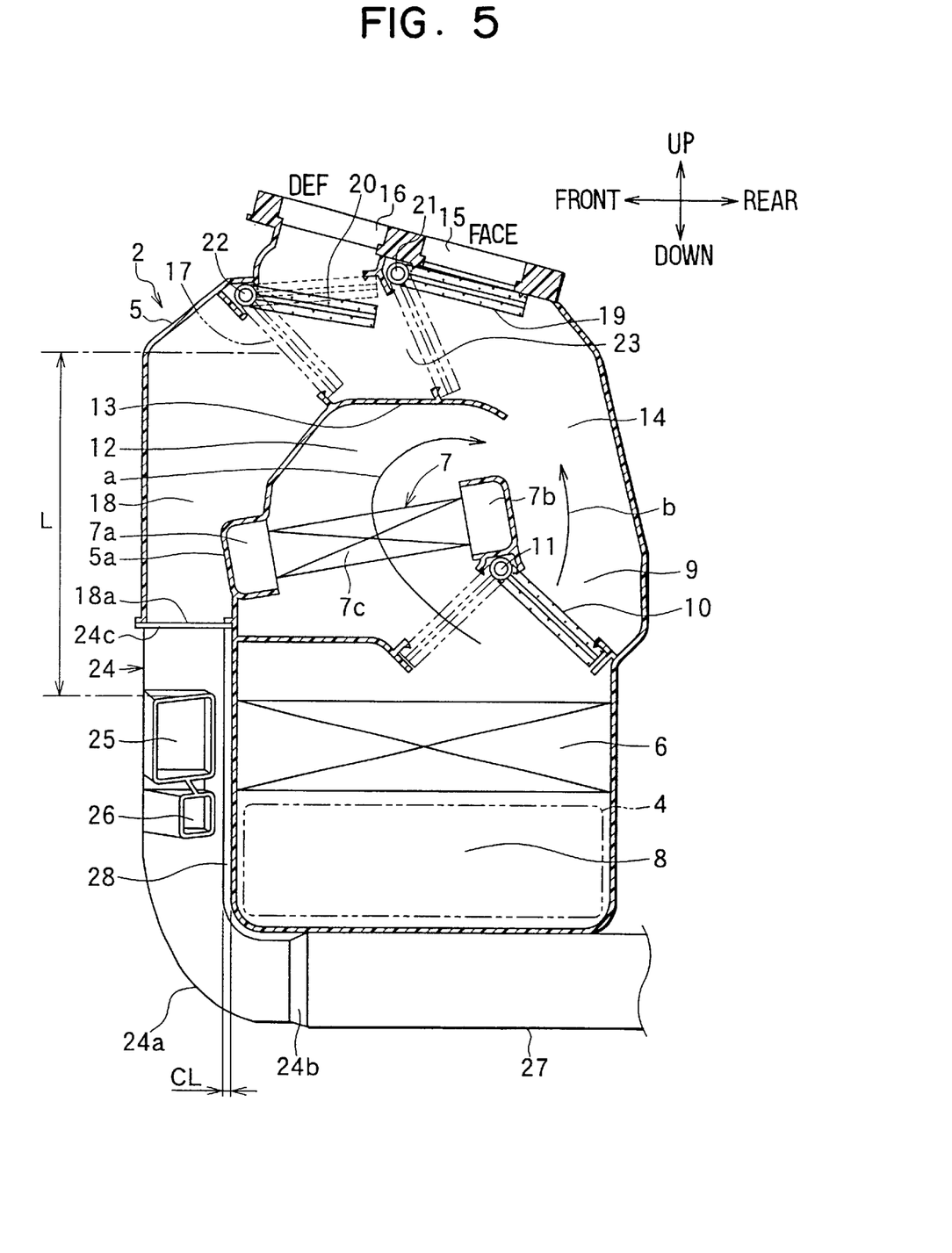
FIG. 5 is a schematic sectional view showing an air conditioning unit of a vehicle air conditioner according to a second preferred embodiment of the present invention.
Figure 6:
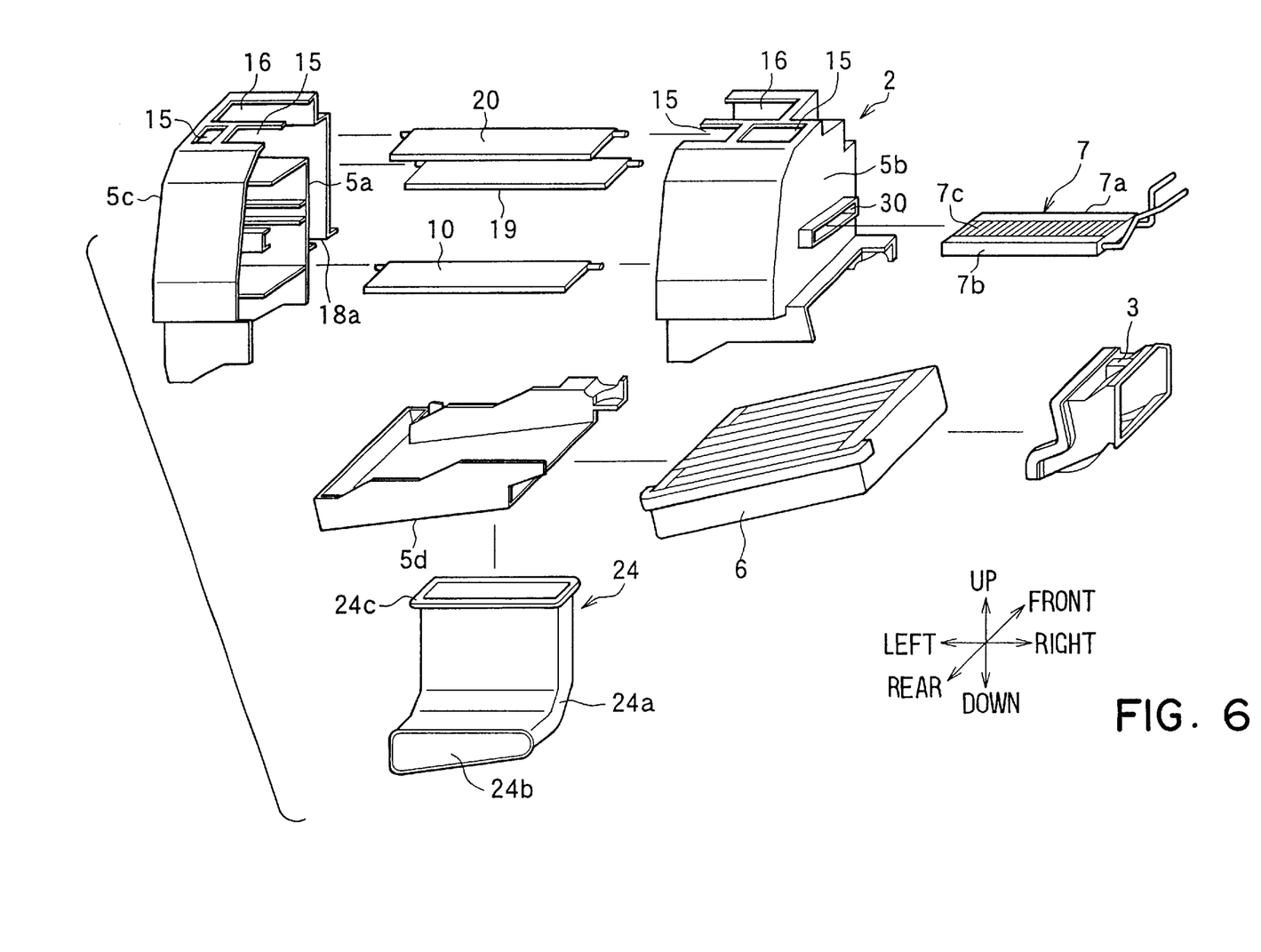
FIG. 6 is perspective exploded view showing the air conditioning unit according to the second embodiment.

In the second embodiment, the air conditioner is installed in the vehicle with a left-hand steering wheel to correspond to arrangement directions indicated by up-down, front-rear and right-left arrows in FIGS. 5 and 6. As shown in FIG. 5, in the second embodiment, a spacing CL of 5–10 mm is provided between the foot duct 24 and the vehicle front surface and the bottom surface of the case 5 to form a heat insulation space 28. The foot duct 24 is a hollow pipe having the curved portion 24a, and is formed by blow molding using resin such as polyethylene. Further, as shown in FIG. 6, an insertion hole 30 through which the heater core 7 is inserted into the case 5 is formed in a right side wall of the case 5 at an upper side of the air inlet 4.

The case 5 is formed by injection molding using resin such as polypropylene. As shown in FIG. 6, the case 5 is formed by joining right, left and lower case portions 5b, 5c and 5d to facilitate removal of a die and to improve assembling efficiency. The case 5 is divided into an upper case portion and the lower case portion 5d at a point corresponding to a substantially center of the evaporator 6 in the vehicle up-down direction. The upper case portion is further divided into the right case portion 5b and the left case portion 5c.

According to the second embodiment, the case 5 can be molded using the die dividable into right, left and lower die portions respectively corresponding to the right, left and lower case portions 5b, 5c and 5d. Therefore, after molding, the right and left die portions can be removed in the vehicle right-left direction, and the lower die portion can be removed in the vehicle up-down direction.

Next, an assembling method of the case 5 will be described. First, each of the air mixing door 10 and the first and second air mode switching doors 19, 20 is disposed at a predetermined position in the right and left case portions 5b, 5c. Then, the right and left case portions 5b, 5c are joined to each other by fasteners such as screws or clips. Thereafter, the heater core 7 is inserted into the joined right and left case portions 5b, 5c through the insertion hole 30. Next, the evaporator 6 is disposed at a predetermined position in the lower case portion 5d, and lower portions of the right and left case portions 5b, 5c and an upper portion of the lower case portion 5d are connected to each other by fasteners such as screws or clips. Then, the connection duct 3 is connected to the air inlet 4 formed by the right and lower case portions 5b, 5d by fasteners such as screws or clips.

In the second embodiment, the foot duct 24 and the rear seat foot duct 27 are secured to the case 5 in the same method as in the first embodiment.

In the first embodiment, during heating, when air having a high temperature heated by the heater core 7 flows through the foot passage 18 and the foot duct 24, the air may heat-exchange with cool air flowing at an upstream air side of the heater core 7 through the case 5.

According to the second embodiment, the heat insulation space 28 is formed between the foot duct 24 and the case 5. Therefore, heat exchange between warm air flowing through the foot duct 24 and cool air flowing at the upstream air side of the heater core 7 is restricted.

In the first and second embodiments, a temperature of air blown into the passenger compartment is adjusted by the air mixing door 10. However, a hot water valve for adjusting an amount of hot water flowing into the heater core 7 may be used to adjust the temperature of air blown into the passenger compartment.

In the first and second embodiments, the foot duct 24 is formed separately from the case 5. However, the foot duct 24 may be integrally formed with the case 5. In this case, the foot passage 18 and the foot duct 24 are integrally formed to communicate with each other.

In the second embodiment, the heat insulation space 28 may be filled with insulation material.

Although the present invention has been fully described in connection with preferred embodiments thereof with reference to the accompanying drawings, it is to be noted that various changes and modifications will become apparent to those skilled in the art.

Such changes and modifications are to be understood as being within the scope of the present invention as defined by the appended claims.

What is claimed is:

1. An air conditioner for a vehicle having a passenger compartment in which an instrumental panel is disposed, said air conditioner comprising:

a case for forming an air passage through which air flows, said case having a face opening, a defroster opening and a foot opening through which the air is blown into the passenger compartment, the case being disposed at an approximate center of the instrument panel in a vehicle right-left direction;

a cooling heat exchanger disposed in a substantially horizontal direction in said case for cooling the air;

a heating heat exchanger disposed in the substantially horizontal direction in said case at an upper side of said cooling heat exchanger and at a lower side of said face opening, said defroster opening and said foot opening for heating the air;

a temperature adjusting member for adjusting a temperature of the air blown into the passenger compartment by adjusting an amount of the air heated by said heating heat exchanger;

an air mode switching door for opening and closing said face opening, said defroster opening and said foot opening; and a foot duct disposed at a vehicle front side of said case to communicate with said foot opening and extending downwardly from an upper portion of said case to a lower portion of said case, said foot duct having a foot outlet at a lower portion thereof through which the air is blown toward a foot portion of a passenger seated on a front seat in the passenger compartment, wherein said foot duct and said foot opening are provided in such a manner that the air flowing from an upper side of said heating heat exchanger in said case is introduced into said foot duct through said foot opening in a foot mode, said foot mode being defined when said foot opening is opened by said air mode switching door; and the foot outlet is opened from side of the foot duct in the vehicle right-left direction toward a vehicle rear side.

2. The air conditioner according to claim 1, further comprising a blower unit for blowing the air toward said case, said blower unit being disposed at a front passenger's side which is shifted from said case in the vehicle right-left direction.

3. The air conditioner according to claim 1, wherein:

said case has a wall portion disposed at the vehicle front side of said heating heat exchanger; and said foot duct is disposed at the vehicle front side of said wall portion.

4. The air conditioner according to claim 1, wherein said foot outlet has first and second foot outlet portions respectively disposed in right and left side walls of said foot duct in the vehicle right-left direction.

5. The air conditioner according to claim 1, further comprising a rear seat foot duct communicating with a lower end of said foot duct and extending toward a rear seat in the passenger compartment along a bottom surface of said case.

6. The air conditioner according to claim 5, wherein said rear seat foot duct is formed separately from said case.

7. The air conditioner according to claim 1, wherein:

said foot duct includes a first foot duct portion and a second foot duct portion disposed at a lower side of said first foot duct portion; and said second foot-duct portion includes said foot outlet and is formed separately from said case.

8. The air conditioner according to claim 1, wherein said foot duct is formed integrally with said case.

9. The air conditioner according to claim 1, wherein said temperature adjusting member is an air mixing door which adjusts a ratio of an amount of the air flowing through said heating heat exchanger to an amount of the air bypassing-said heating heat exchanger.

10. The air conditioner according to claim 1, wherein a distance between said foot opening and said foot outlet in a vehicle up-down direction is equal to or greater than 150 mm.

11. The air conditioner according to claim 1, further comprising a heat insulation member disposed between said foot duct and said case for restricting heat transmission between said foot duct and said case.

12. The air conditioner according to claim 11, wherein said heat insulation member is a space formed between said foot duct and said case.

13. The air conditioner according to claim 12, wherein said space is filled with an insulation material.

14. The air conditioner according to claim 1, wherein:
said case has an air inlet from which air is introduced into said case; and
said air inlet is provided under said cooling heat exchanger.

15. The air conditioner according to claim 1, wherein said foot outlet is disposed at a front side of said case.

16. An air conditioner for a vehicle having a passenger compartment, the air conditioner comprising:
a case defining an air passage through which air flows, the case having at least a foot opening through which air is blown toward a lower side in the passenger compartment;
a cooling heat exchanger for cooling air, disposed substantially horizontally in the case so as to allow passage of air through the cooling heat exchanger from below upwardly;
a heating heat exchanger, for heating air from the cooling heat exchanger, disposed substantially horizontally in the case at an upper side of the cooling heat exchanger and at a lower side of the foot opening;
an air mode switching door for opening and closing the foot opening, disposed in the case at an upper side of the heating heat exchanger;
a foot duct disposed at a vehicle front side of the case to communicate with the foot opening, the foot duct extending downwardly from an upper position of the case to a lower position of the case, wherein:
the foot duct has a foot outlet from which air is blown toward the lower side of the passenger compartment; and
the foot outlet is provided at a lower side position in the foot duct.

17. The air conditioner according to claim 16, wherein:
the case has an air inlet from which air is introduced into the case; and
the air inlet is provided under the cooling heat exchanger.

18. The air conditioner according to claim 16, wherein:
the case has a wall portion disposed at a direct vehicle front side of the heating heat exchanger; and
the foot duct is disposed at a vehicle front side of the wall portion of the case.

* * * * *